Patented May 9, 1944

2,348,191

UNITED STATES PATENT OFFICE 2,348,191

SEPARATORY PROCESS

James Allan Camelford, Chagrin Falls, Ohio, assignor to Alox Corporation, New York, N. Y., a corporation of New York No Drawing. Application February 7, 1942, Serial No. 429,945

6 Claims. (Cl. 260—452)

This invention relates to the art of separating into its component parts a reaction mixture produced by the liquid-phase, controlled, partial oxidation of a mixture of essentially saturated hydrocarbons of mineral origin (e. g., petroleum oil, or a liquid or solid fraction of petroleum or equivalent mixture of mineral hydrocarbons) as produced by the Burwell process of oxidation disclosed in U. S. patents, Nos. 1,690,768 and 1,690,769. It is concerned particularly with the separation of unoxidized hydrocarbons from admixture thereof with the unsaponifiable oxygenated hydrocarbons (viz., alcohols, alcohol-ketones, ketones and poly-alcohols) remaining in such oxidation reaction mixtures after saponifiable components have been removed therefrom. By the expression "saponifiable components" is meant those ingredients of the total oxidation reaction mixture which are readily convertible into alkali metal soaps by treating said mixture with aqueous alkali, e. g., with an aqueous solution of caustic soda. By the expression "unsaponifiable components," as hereinafter employed, is meant the residue of said total oxidation reaction mixture remaining after separation therefrom of the aforesaid "saponifiable components."

When mixtures of petroleum hydrocarbons, including petroleum waxes and petroleum distillates, both light and heavy, are subjected to oxidation by the aforesaid procedure there are produced oxidation reaction mixtures which in each instance contain a great number of different oxidation products, both acidic and non-acidic, together with more or less unoxidized ("original") hydrocarbons. Among the "acidic" or saponifiable oxidation products are free carboxylic and hydroxy-carboxylic acids, lactones of those acids, and readily saponifiable esters likewise formed from those acids. Among the "non-acidic" oxidation products are alcohols, alcohol-ketones, ketones, and poly-alcohols.

These latter, when they have been separated from saponifiables and from unoxidized hydrocarbons, exhibit properties which make them particularly useful in one or another of a variety of connections (e. g., as corrosion-preventing agents, etc.). The separation of saponifiables from the oxidation reaction mixture is readily accomplished by treatment with aqueous alkali (e. g., caustic soda solution) and separation of the resulting aqueous portion from the oily non-aqueous portion. However, the satisfactorily complete separation of unoxidized hydrocarbons from the oily non-aqueous portion has until now not been realized in a commercially practical manner.

An object of the present invention is to provide an inexpensive and commercially practical and feasible process for the substantially complete separation, without chemical action, of unoxidized hydrocarbons from the valuable unsaponifiable oxidation products derived from petroleum hydrocarbon mixtures by the Burwell oxidation process.

I have found that the unoxidized hydrocarbons of the oxidation reaction mixture are completely insoluble in glacial acetic acid, whereas the unsaponifiable oxidation products (alcohols, alcohol-ketones, ketones and poly-alcohols) as a group are soluble therein. I have found, further, that the glacial acetic acid is a particularly advantageous separatory agent in the present connection because it does not react with the material treated. The process of the present invention, then, consists essentially in dispersing the saponifiables-free oxidation reaction mixture in dry or non-aqueous form in glacial acetic acid, separating the resulting solution from insoluble hydrocarbons, and subsequently removing the solvent (i. e., the glacial acetic acid) from the solution. The resulting separated mixture of alcohols, alcohol-ketones, ketones and poly-alcohols may, if desired, be washed with weak caustic alkali and then with water, and finally dried. Preferably, the glacial acetic acid is removed from its admixture with unsaponifiable oxidation products by distillation, the acid distilling at about 116° C., whereas the unsaponifiable oxidation products do not (to any material extent) distil below about 150° C. (e. g., between about 150 and about 250° C., depending upon the boiling point of the starting material). The separatory process lends itself to a cyclical use of the solvent, the distilled glacial acetic acid being suitable for direct re-use in dissolving unsaponifiable oxidation products from a further batch or quantity of the saponifiables-free material. If the latter is not strictly anhydrous, it is desirable that its water content be balanced by a suitable addition of acetic anhydride, or be diminished by heating, to the end that the solvent be maintained at substantially 100% strength.

The following is a non-limitative illustration of the working of the process as applied to a crude oxidation reaction mixture from 36-40° fuel oil of Pennsylvania origin, said mixture containing about 80-70% unoxidized ("original") hydrocarbons, about 5-10% unsaponifiables (including alcohols, alcohol-ketones, ketones and poly-alcohols) and about 15-20% of saponifiables:

1 kilogram of the crude oxidation reaction mixture was treated with aqueous caustic soda (10% strength) under conditions to saponify all the acids, lactones and saponifiable esters contents thereof, and, after quiescent settling, the resulting supernatant oily layer (consisting of unoxidized hydrocarbons and unsaponifiable oxidation products including alcohols, alcohol-ketones, ketones and poly-alcohols) was removed from the subnatant aqueous layer (containing saponified oxidation products) and dried to substantially anhydrous state. The weight of the dried mixture was 700 grams.

The so-separated and dried material, which consisted of about one-third unsaponifiable oxidation products and two-thirds unoxidized hydrocarbons, were shaken with and thoroughly dispersed in an excess of glacial acetic acid, at normal room temperature. Upon settling, the insoluble unoxidized hydrocarbons formed a supernatant layer above and cleanly separable from the resulting glacial acetic acid solution of unsaponifiable oxidation products. The supernatant layer was removed (weight 483 grams), and the solution was distilled at about 120° C. until no more distillate passed over. The still residue was found to consist essentially of the unsaponifiable oxidation products substantially completely freed from unoxidized hydrocarbons and containing a very small amount of contaminating acetic acid. The still residue was washed with dilute aqueous caustic, until free from the last trace of aicd, and then with water; the washed product finally was dried by heating at above the boiling point of water until substantially anhydrous. The weight of the washed and dried still residue was 2.07 grams, or about 30% of the starting material. Loss in working: 10 grams.

The distillate was, upon test, found to consist of glacial acetic acid sufficiently free from contamination to be suitable for direct re-use in a repetition of the process on a fresh quantity of the saponifiables-free starting mixture.

In duplications of the above procedure, it was found that the process was equally applicable to the saponifiables-free mixtures from the oxidation, by the Burwell process, of paraffin wax, of "Sharples" wax, of kerosene distillate and of light lubricating oil. It was found that, in each instance, the group of alcohols, alcohol-ketones, ketones and poly-alcohols so separated was substantially free from unoxidized hydrocarbons and as well from saponifiable oxidation products. The separation treatment had not changed the constitutions or properties of the unsaponifiables, but had effected a surprisingly clean separation of the same as a group, from the unoxidized hydrocarbons, with advantageous economy of materials, equipment and labor.

I claim:

1. Process of removing unoxidized hydrocarbons from a saponifiables-free mixture of unoxidized hydrocarbons and unsaponifiable oxidation products resulting from the liquid-phase controlled partial oxidation of a mixture of essentially saturated aliphatic hydrocarbons of mineral origin, which comprises dispersing the saponifiables-free mixture in glacial acetic acid, separating the resulting solution from material insoluble in the glacial acetic acid, and removing the glacial acetic acid from the solution.

2. Process of removing unoxidized hydrocarbons from a saponifiables-free mixture of unoxidized hydrocarbons and unsaponifiable oxidation products resulting from the liquid-phase controlled partial oxidation of a mixture of essentially saturated petroleum hydrocarbons, which comprises dispersing the saponifiables-free mixture in glacial acetic acid, separating the resulting solution from material insoluble in the glacial acetic acid, and removing the glacial acetic acid from the solution.

3. Process of removing unoxidized hydrocarbons from a substantially anhydrous saponifiables-free mixture of unoxidized hydrocarbons and unsaponifiable oxidation products resulting from the liquid-phase controlled partial oxidation of a mixture of essentilly saturated petroleum hydrocarbons, which comprises dispersing the substantially anhydrous saponifiables-free mixture in glacial acetic acid, separating the resulting solution from material insoluble in the glacial acetic acid, and removing the glacial acetic acid from the solution.

4. Process of removing unoxidized hydrocarbons from a saponifiables-free mixture of unoxidized hydrocarbons and unsaponifiable oxidation products resulting from the liquid-phase controlled partial oxidation of a mixture of essentially saturated petroleum hydrocarbons, which comprises dispersing the saponifiables-free mixture, at substantially normal room temperature, in glacial acetic acid, separating the resulting solution from material insoluble in the glacial acetic acid, and removing the glacial acetate acid from the solution.

5. Process of separating unoxidized hydrocarbons from a saponifiables-free mixture of unoxidized hydrocarbons and unsaponifiable oxidation products resulting from the liquid-phase controlled partial oxidation of a mixture of essentially saturated petroleum hydrocarbons, which comprises dispersing the saponifiables-free mixture in glacial acetic acid, separating the resulting solution from material insoluble in the glacial acetic acid, and removing the glacial acetic acid from the solution by distillation at between 116° C. and the boiling point of said unsaponifiable oxidation products.

6. Process of separating unoxidized hydrocarbons from a saponifiables-free mixture of unoxidized hydrocarbons and unsaponifiable oxidation products resulting from the liquid-phase controlled partial oxidation of a mixture of essentially saturated petroleum hydrocarbons, which comprises dispersing the saponifiables-free mixture in glacial acetic acid, separating the resulting solution from material insoluble in the glacial acetic acid, removing the glacial acetic acid from the solution, and neutralizing, washing and drying the residue.

JAMES ALLAN CAMELFORD.